2,278,453
Patented Oct. 11, 1966

3,278,453
METHOD OF PREPARING AN ALUMINA SUPPORTED DEHYDROGENATION CATALYST COMPOSITION
Arnold N. Wennerberg, Chicago, Ill., assignor to Standard Oil Company, Chicago, Ill., a corporation of Indiana
No Drawing. Filed Aug. 21, 1963, Ser. No. 303,676
1 Claim. (Cl. 252—463)

This invention relates to a new catalyst composition and more specifically pertains to a metal oxide catalyst for dehydrogenation.

A new catalyst composition has been discovered which is useful for converting hydrocarbons by dehydrogenation to more useful unsaturated compounds, for example, for converting mono-olefins to conjugated dienes, dehydrogenating alkyl hydrocarbon substituted aromatic hydrocarbons having two or more carbon atoms in the alkyl hydrocarbon substituent to vinyl aromatics, converting certain $C_6$ mono-olefins to benzene and alkyl substituted benzenes through dehydrogenation and cyclization as well as isomerization and other dehydrogenation processes. This new catalyst composition comprises the oxides of three different classes of metals: low melting metals of periodic group II B having an atomic weight of from about 65 to about 113, e.g. zinc or cadmium, an alkaline earth metal and aluminum. The proportion of oxide of each class of three metals can vary over a wide range. For example, from a component weight ratio based on 10 parts of $Al_2O_3$ as in the range of 0.1 to 5 low melting metal oxide-0.1 to 5 alkaline earth metal oxide-10 $Al_2O_3$. The amount of low melting metal as its oxide need not be equal in weight to alkaline earth metal oxide but rather can vary as in the weight ratio range of low melting metal oxide to alkaline earth metal oxide of from 0.5:1 to 3:1. Desirable catalyst compositions of this invention are those in which the alkaline earth metal oxide are oxides of magnesium, calcium or barium. The catalyst compositions containing oxides of calcium or barium are capable of producing substantially the same percent conversions as those containing magnesium oxide but with respect to selectivity the calcium oxide or barium oxide containing catalysts have demonstrated a lower selectivity level with respect to the desired conversion product than the magnesium oxide containing catalysts have demonstrated. Thus, as a class, low melting metal-MgO-$Al_2O_3$ catalysts are preferred. Of this preferred class of catalysts, those containing oxides of zinc are preferred over those containing oxides of cadmium.

Examples of typical component weight ratios of catalyst compositions representing the combination of oxides of metals of the most preferred catalyst compositions are illustrated in Table I TABLE I.—ZnO-MgO-$Al_2O_3$ COMPONENT WEIGHT RATIO

| ZnO | MgO | $Al_2O_3$ |
|-----|-----|-----------|
| 0.10 | 0.10 | 10 |
| 0.10 | 0.20 | 10 |
| 0.20 | 0.10 | 10 |
| 0.28 | 0.20 | 10 |
| 0.38 | 0.29 | 10 |
| 0.39 | 0.50 | 10 |
| 0.53 | 0.23 | 10 |
| 0.55 | 0.55 | 10 |
| 0.84 | 0.30 | 10 |
| 0.85 | 0.51 | 10 |
| 1.09 | 0.36 | 10 |
| 1.25 | 1.25 | 10 |
| 2.0 | 2.0 | 10 |
| 3.0 | 3.0 | 10 |
| 3.3 | 3.3 | 10 |
| 5.0 | 5.0 | 10 |

As illustrated above and based on the $Al_2O_3$ content in the most preferred catalyst composition each of ZnO or MgO can vary independent of each other in the range of from 0.1 to 5.0 weight parts per 10 parts by weight of $Al_2O_3$ and the total of ZnO plus MgO can vary in the range from 0.02 to 10 weight parts per 100 parts by weight of $Al_2O_3$. Catalyst compositions like the foregoing typical compositions having cadmium oxide in place of the zinc oxide are typical of other prepared catalyst compositions.

One advantage possessed by the catalyst composition of this invention is its ability to dehydrogenate mono-aliphatic olefins to conjugated diolefins without skeletal rearrangement of the mono- or diolefin. Thus isoamylene can be dehydrogenated to isoprene without substantial production of piperylene. Another advantage possessed by the catalyst composition is its consistent high selectivity 90 to 99% for mono-olefin dehydrogenation to conjugated dienes and for dehydrogenation of ethyl and isopropyl substituted aromatics to vinyl aromatics. Another advantage possessed by the catalyst composition of this invention is its ability to exercise a catalytic effect to achieve conversions substantially approaching the thermodynamic equilibrium for such reversible conversions. The catalyst compositions also possess the advantageous property of functioning with exceptionally high liquid hourly space velocities (volume of liquid per volume of catalyst per hour) with the high selectivity at substantially the thermodynamic equilibrium conversion.

The catalyst composition of this invention accomplishes the foregoing advantages at substantially lower temperatures than those temperatures used with other catalysts. For example, the catalysts of this invention used for the conversion of isoamylene to isoprene will at liquid hourly space velocities of up to 10 or higher of isoamylene feed and at 525 to 590° C. produce isoprene with 90 to 95% and above selectivity at conversions of 23 to 45% and above. In contrast a chromia-alumina catalyst at 525° C., tolerating a liquid hourly space velocity of isoamylene at this temperature of only about 1 has an 85% selectivity at 18% conversion to isoprene; and a potassium modified Fe-Cu-Mg catalyst requires a temperature of 650° C. with a liquid hourly space velocity of isoamylene of 1 to 2 to achieve a 50% conversion to isoprene at 71% selectivity.

The greater tolerance of the catalysts of this invention for high liquid hourly space velocities for other hydrocarbon conversion processes is as striking as for the conversion of ethyl and isopropyl substituted aromatics to vinyl substituted aromatics as for the conversion of mono-olefins to dienes. For example, the catalyst of this invention tolerates liquid hourly space velocities of more than 5 times that tolerated by catalysts in prior commercial operations.

While catalysts in prior commercial operations can be used for hydrocarbon conversions such as isoamylenes to isoprene, butanes to butadiene, ethylbenzene to styrene, cumene to alpha-methyl styrene and p-cymene to alpha, para-dimethyl styrene using steam as a diluent, the catalyst compositions of this invention cannot tolerate steam. However, other diluents such as inert gases, e.g. nitrogen, argon, etc. and vapors of hydrocarbons inert to the feed hydrocarbon and/or resultant product can be used. The selection of diluent presents no problem, therefore. Inert hydrocarbon diluents of substantial heat capacity can be used to supply heat to the endothermic dehydrogenation hydrocarbon conversions for which the catalysts of this invention find exceptional use.

Another disadvantage of the catalyst compositions of this invention are their inability to dehydrogenate saturated aliphatic hydrocarbons, alkanes, to mono-olefins. However, this disadvantage can be turned to advantage for the alkanes can be used not only as feed diluents but also as heat carriers.

One convenient method for preparing the catalyst compositions of this invention comprises the dispersion-interaction of molten low melting metal in the correct proportions with precalcined mixture of alkaline earth metal and aluminum compounds providing the ratio of alkaline earth metal oxide to $Al_2O_3$ hereinbefore disclosed. The dispersion of molten low melting metal on alkaline earth metal oxide-$Al_2O_3$ can be carried out at about 320° to 500° C. under a blanket of gas non-reactive with the catalyst components, e.g. argon, nitrogen, etc.; producing a catalyst composition precursor believed to be Zn or cadmium on the alkaline earth metal oxide-$Al_2O_3$. Thereafter, this mixture is heated in the presence of oxygen, in the range of 1 to 10% oxygen by volume, starting with dilute oxygen such as 1 to 5% $O_2$ by vol., to prevent the formation of hot spots which would result in the loss of the low melting metal. Other techniques for dispersing metals on solids can be used. Catalyst compositions of this invention can also be prepared by the interaction of the correct proportions of ZnO or CdO with molten alloy of aluminum and alkaline earth.

The catalyst composition is prepared in a granular form suitable for use in either a fixed bed catalyst system, a moving catalyst system or a fluidized bed catalyst system. As will be readily understood by those skilled in this phase of catalysis, the operation and use of these various catalyst bed systems, the size of the granular catalyst composition is selected according to its ultimate use in fixed, moving or fluidized bed systems. However, the size of the granular particles of catalyst compositions range of 300 to 525° C. starting at the lower temperature and increasing to the higher temperature, thus calcining and oxidizing the zinc metal. A catalyst whose composition is found by analysis to be 2.0 ZnO/1.4 MgO/10 $Al_2O_3$ results.

In another mode of operation, CdO-MgO-$Al_2O_3$ type catalyst compositions of the preferred class can be prepared by dispersing molten cadmium (M.P. 320.9° C.) on a composite of MgO-$Al_2O_3$ in the proper weight ratio. Also ZnO-CaO-$Al_2O_3$, ZnO-BaO-$Al_2O_3$, CdO-CaO-$Al_2O_3$ and CdO-BaO-$Al_2O_3$ catalyst compositions of lower selectivity can be obtained by the same technique by substituting the proper amount of $Ca(OH)_2$ or CaO or $Ba(OH)_2$ or BaO for $Mg(OH)_2$ used in the example.

In the oxidizing-calcining step of the technique for preparing the catalysts of this invention temperatures at the lower end of 300 to 600° C. range are first employed with the low oxygen-content gas. The temperature of the mass of granulated catalyst precursor is permitted to increase to the upper end of the range, i.e. approaching 600° C. at the upper end of the oxidating-calcining step, e.g. 500–550° C. as a maximum.

The following results in Table II from dehydrogenation experiments, feed pressure 2–3 p.s.i.g., illustrate the use of the catalyst compositions on this invention wherein "LHSV" is: liquid hourly space velocity for 20 grams of catalyst volume. By feed pressure is meant the partial pressure of the feed and the mixture of diluent gas and hydrocarbon. In Table II initial conversion is the initial conversion of the feed hydrocarbon taken from a single pass of the feed hydrocarbon over the catalyst.

TABLE II

| Experiment No. | Compound to be Dehydrogenated, Temp. | LHSV Hydrocarbon | Diluent, mole/mole hydrocarbon | Catalyst ratio weight parts | | | Efficiency | |
|---|---|---|---|---|---|---|---|---|
| | | | | ZnO | MgO | $Al_2O_3$ | Percent Initial Conversion | Percent Feed Selectivity |
| 1 | Isoamylene, 590° C | 10:1 | $N_2$, 7.1/1.0 | 2 | 1.4 | 10 | 45.0 | 90 |
| 2 | Isoamylene, 525° C | 10:1 | $N_2$, 7.1/1.0 | 2 | 1.4 | 10 | 23.8 | 95 |
| 3 | Isoamylene, 590° C | 10:1 | $N_2$, 5.0/1.0 | 1.09 | 0.36 | 10 | 26.4 | 96.3 |
| 4 | Isoamylene, 590° C | 5:1 | $N_2$, 5.0/1.0 | 0.38 | 0.3 | 10 | 30.6 | 93.8 |
| 5 | Isoamylene, 590° C | 5:1 | $N_2$, 5.0/1.0 | 1.25 | 1.25 | 10 | 22.0 | 90.4 |
| 6 | Isoamylene, 590° C | 5:1 | $N_2$, 5.0/1.0 | 3.3 | 3.3 | 10 | 33.7 | 94.6 |
| 7 | Isoamylene, 590° C | 5:1 | $N_2$, 5.0/1.0 | 5 | 1.6 | 10 | 33.6 | 94 |
| 8 | Ethylbenzene, 600° C | 5:1 | $N_2$, 9.0/1.0 | 3.3 | 3.3 | 10 | 49.5 | 97 |
| 9 | Cumene, 600° C | 5:1 | $N_2$, 9.0/1.0 | 3.3 | 3.3 | 10 | 57.4 | 90 |
| 10 | Diisobutylene to p-xylene, 600° C | 5:1 | $N_2$, 7.1/1.0 | 3.3 | 3.3 | 10 | 48 | 93 |
| 11 | Isoamylene, 525° C | 10:1 | A6:1 | 1.25 | [1] 1.25 | 10 | 22.4 | 86 |
| 12 | Isoamylene, 525° C | 10:1 | A7.5:1 | [2] 1 | 1 | 10 | 14.1 | Above 85 |

[1] BaO in place of MgO (1.25 ZnO–1.25 BaO–10$Al_2O_3$).
[2] CdO in place of ZnO (1 CdO–1 MgO–10 $Al_2O_3$).

of this invention is not critical to the dehydrogenation reactions and thus size of the granular particles is not a limitation on the novel catalyst compositions but rather size is a subject only to the choice of type of catalyst bed in which the novel catalyst compositions are used.

The following example illustrates one mode of preparation of catalyst compositions of this invention, in this a composition of the most preferred class of catalyst composition.

*Example*

A catalyst composition is prepared by suspending 20 grams $Mg(OH)_2$ and 100 grams gamma alumina (20–48 mesh) in one liter of distilled water. The suspension is agitated while water is removed at 20 mm. Hg and 80° C. The resulting free flowing granular solid is calcined at 100° to 600° C. (maximum) at 0.1 mm. Hg to produce a dry hygroscopic, granular solid. This solid is transferred under dry argon gas blanket to a reaction vessel and the solid is mixed at 480° C. with 16 grams zinc (M.P. 419° C.) under argon gas blanket and then, still, under argon gas blanket, 20 grams of the resulting solid is transferred to a reactor tube in the presence of a gas stream of 97% $CO_2$ and 3% $O_2$ by volume over the temperature When calcium oxide or barium oxide replace magnesium oxide in the catalysts whose uses are hereinbefore illustrated in Table II, the initial selectivities are about 50 percent lower. Initial selctivities are calculated from conversion and product distribution data after the catalyst has been first contacted with hydrocarbon feed for five minutes under the conversion conditions. As will be appreciated, the conversion decreases as the catalyst becomes deactivated by coke deposits and other reactive cite deactivation. For example, the conversion of cumene to alpha-methylstyrene in 2.0 hours on stream decreased from 57.4 to 52%.

The catalyst of this invention can be reactivated or regenerated by treating the deactivated catalyst at 300 to 525° C. with air or preferably a mixture of 3 to 10% oxygen and 90 to 97% carbon dioxide.

The catalyst of this invention can also be employed to isomerize and dehydrogenate diisobutylene and then cyclize the dehydrogenation product to a xylene product containing predominantly p-xylene.

From the foregoing versatility and wide application of the catalyst composition of this invention, it is readily apparent that the catalysts of this invention are exceptionally useful.

What is claimed is:

A method for the preparation of catalyst compositions comprising alumina and one oxide of each of two classes of metals comprising alkaline earth metals and low melting metals of periodic group IIb which comprises preparing a uniform aqueous dispersion of an alkaline earth metal hydroxide and alumina, removing water from the aqueous dispersion to provide a uniform particle composition of alkaline earth metal hydroxide deposited on alumina, calcining said alkaline earth metal hydroxide on alumina at a temperature in the range of 100 to 600° C. to a free flowing, hygroscopic mixture, blanketing said free flowing, hygroscopic mixture under a gas non-reactive with said free flowing hygroscopic mixture and while under said gas blanket mixing with a low melting metal of periodic group IIb of an atomic weight of from 65 to about 113 at a temperature in the range of form 320 to 500° C., and thereafter heating said mixture in the presence of dilute oxygen in the range of 1 to 10% oxygen by volume at a temperature in the range of from 300 to 600° C. starting at a temperature at the lower portion of said temperature range above 300° C. and increasing the temperature substantially uniformly to a temperature above about 500° C. until said low melting metal is converted to its oxide.

References Cited by the Examiner
UNITED STATES PATENTS

| | | | |
|---|---|---|---|
| 2,193,464 | 3/1940 | Natta | 252—475 |
| 2,693,497 | 10/1954 | Ballard et al. | 252—463 X |
| 2,767,221 | 10/1956 | Ballard et al. | 252—463 X |
| 2,822,336 | 2/1958 | Polack | 252—475 X |

OSCAR R. VERTIZ, *Primary Examiner.*

MAURICE A. BRINDISI, *Examiner.*

G. OZAKI, *Assistant Examiner.*